455-619 AU 233 EX
FIP8106 XR 2,976,419
[redacted]

(1)

APPARATUS FOR DETECTING SOURCES OF INFRA-RED RAYS

Filed Sept. 7, 1954 2 Sheets-Sheet 1 see col. 4

INVENTORS
JOSEPH FERDINAND MENKE,
ERNST HANS DOERPINGHAUS,
BY
Robert B [signature]
ATTORNEY INVENTORS
JOSEPH FERDINAND MENKE,
ERNST HANS DOERPINGHAUS,
BY
Robert B Larson
ATTORNEY 2,976,419

APPARATUS FOR DETECTING SOURCES OF INFRA-RED RAYS

Joseph Ferdinand Menke and Ernst Hans Doerpinghaus, Zurich, Switzerland, assignors to Brinro Limited S.A., Tangiers, Morocco, a society of France Filed Sept. 7, 1954, Ser. No. 454,337

Claims priority, application Luxembourg Sept. 14, 1953

9 Claims. (Cl. 250—83.3)

The present invention relates to apparatus for detecting infra-red rays, in particular for military purposes in view of the fact that such rays are used for noctovision and generally for invisible transmission of signals, orders, etc.

The object of our invention is to provide an apparatus of this kind which is better adapted to meet the requirements of practice than those used up to now, in particular from the point of view of efficiency, facility of use, weight and dimensions.

With this object in view, according to our invention, such an apparatus is mainly constituted by an electronic device including a variable capacity system and capable of producing a sound in response to a variation of the capacity of said system, at least one element of said system being sensitive to the direct action thereon of infra-red rays to vary said capacity when struck by said rays.

Preferably said electronic device is constituted by two oscillators normally tuned to the same frequency and both connected with the input of a frequency mixer, said variable capacity system being mounted to act upon one of said oscillators to vary the frequency thereof in response to the reception of infra-red rays.

According to an embodiment of our invention, said variable capacity system is constituted by a capacitor the dielectric of which has a dielectric constant variable under the effect of infra-red rays acting thereon, in particular a capacitor including a Lenard type phosphor, for instance including zinc and/or cadmium (which may be combined to sulfur, selenium or tellurium). Such elements are described in "Taschenbuch für Chemisker und Physiker" by J. d'Ans and E. Lax, chapter 384, pages 1151 to 1158 (Springer, Berlin, 1943).

Said system may also be constituted by the combination of an electronic tube, a capacitor and a resistance sensitive to the action of infra-red rays, such a resistance being in particular constituted mainly by lead sulfide or the like.

The two oscillators are preferably made symmetrical, that is to say exactly identical, so that temperature variation cannot modify the equality of the component frequencies fed to the mixer.

Owing to the small size of such capacitors and to the use of electronic tubes of the midget type, the whole of the elements of the apparatus can be housed in a small casing of light weight convenient to carry, whereas the sounds or sound variations produced by this apparatus are transmitted through an earphone.

Preferred embodiments of our invention will be hereinafter described with reference to the accompanying drawings, given merely by way of example, and in which.

Figure 1:
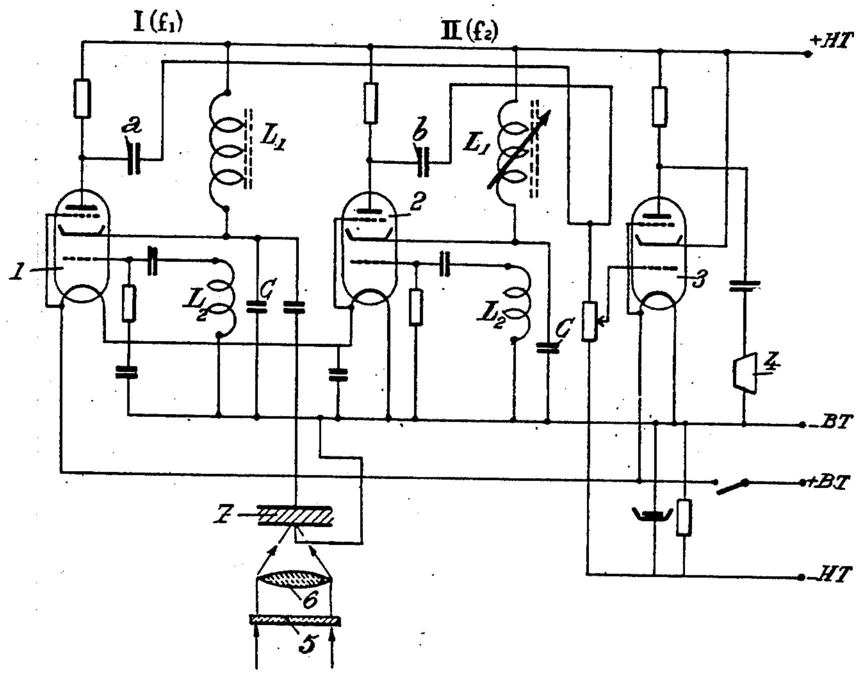
Fig. 1 is a diagrammatical view of an apparatus for detecting infra-red rays according to our invention.

The apparatus according to the present invention is chiefly intended to be used for military purposes in order to detect the existence of infra-red radiations.

The development of transmission devices making use of infra-red rays, in particular for noctovision, observation, remote control, signalling, etc., made it necessary to provide apparatus which enable men in the field to detect a beam of infra-red rays through which they are passing.

Such apparatus must comply with some requirements, in particular from the point of view of sensitivity. This must be such that a signal is obtained when the detector apparatus is located, with respect to the infra-red transmitter, at a distance higher than the useful range of this transmitter. Furthermore these detecting apparatus must make it possible to find the direction of the transmitter, at least approximately. Finally, they must be of a weight as light as possible so that they can be easily handled by a man.

These conditions are difficult to comply with and they are not satisfactorily fulfilled in the apparatus existing at the present time.

Some of these known apparatus are based upon the extinguishing of phosphorescent materials under the effect of infra-red rays. But they make it necessary to observe this material in a continuous fashion. Furthermore, their sensitivity is insufficient.

Other apparatus make use of caseium or silver photocathodes and, under the effect of infra-red rays, they cause a material which is normally dark to become luminous. They are used with quasistatic high tension sources (Zamboni columns) and their weight can be rather small but their sensitivity is not satisfactory because it is too much limited in the spectrum. It becomes zero for radiations of a wave-length higher than 1.2 microns.

It has also been suggested to cause the infra-red rays to act upon a sensitive element of an electronic device in such manner as to produce a sound, whereby infra-red rays are acoustically detected. But in such known apparatus the infra-red ray sensitive system was constituted by a capacitor having a movable diaphragm indirectly influenced by the infra-red rays, of the same kind as the capacitors used in apparatus for analyzing infra-red radiation gases. Now, such capacitors are too little sensitive and they require the provision in the receiver of an optical system for concentrating the infra-red rays on the capacitor. On the other hand they are highly sensitive to shocks or vibrations, due to the inertia of the movable diaphragm. Therefore, such apparatus either are of too low a sensitivity or have too narrow a field due to the small aperture of the optical system. Furthermore they are heavy and bulky and cannot be portable.

In order to obviate these drawbacks, we make use of a sensitive system the infra-red ray responsive element of which is fixed and directly acted upon by said infra-red rays.

According to a first embodiment of our invention, such a variable capacity system may be constituted by a capacitor the dielectric element of which has a dielectric constant variable under the effect of infra-red rays.

Such capacitors have a high sensitivity in particular those including a Lenard type phosphor, that is to say one including zinc and/or cadmium, for instance in the form of salts such as sulfides. However sulfur may be replaced by selenium or tellurium.

Furthermore, this sensitivity is particularly high in the spectral range corresponding to the phenomena with which the present invention is concerned, i.e., for wavelengths ranging from 0.5 to 2 microns.

Finally, such capacitors are uninfluenced by shocks since they include no movable diaphragm.

According to a preferred embodiment of our invention, we make use of two oscillators I and II which supply alternating voltages or currents of substantially equal frequencies $f_1$, $f_2$ which are mixed in heterodyne-like fashion so as to obtain beats at the differential pressure $f_m=f_1-f_2$. The infra-red rays to be detected are arranged to act upon one of these oscillators, for instance oscillator 1 by means of a variable capacity system as above mentioned in order to modify the frequency thereof.

Thus when no infra-red rays are being received, there is no acoustic signal since frequency $f_m$ is equal to zero, $f_1$ being equal to $f_2$. On the contrary, as soon as an infra-red rays beam is received, it modifies the value of $f_1$ and the acoustic signal resulting from the transformation of the electric beats into sound waves is the higher as the intensity of the incident infra-red beam is higher.

On Fig. 1, we have shown diagrammatically a heterodyne arrangement according to an embodiment of the present invention.

Each of the two oscillators I and II includes a pentode tube 1 or 2 with electron coupled oscillator lay-out, the oscillating circuit including a self-inductance $L_1$ and at least one condenser C. The grid reaction self-inductances are shown at $L_2$. Heating is obtained from the low voltage source and anode voltage is obtained from a high voltage source through resistors or other coupling elements. Any other oscillating arrangement might be used according to this invention.

The oscillations of frequency $f_1$, $f_2$ produced in the anode circuits of these oscillator units are fed to the grid of a mixer tube 3. On the anode of this tube there is received a beat oscillation of a frequency $f_1-f_2$, which oscillation is transformed into an acoustic signal in a telephone receiver 4 or the like.

The infra-red rays are received, possibly after filtering through a screen 5 (which for instance, during the day time, stops the light rays), on a capacitor 7 which has a dielectric constant variable in response to variations of the infra-red flux striking it, said capacitor being inserted in the oscillating circuit of oscillator I.

It can be demonstrated that when the capacity $c$ of this capacitor 7 varies by an amount equal to $dc$ under the influence of an infra-red radiation, there is obtained a variation $df$ for frequency $f_1$, according to the formula:

$$\frac{dc}{c}=\frac{1}{2}\frac{df}{f_1}$$

It is this difference $df$ which is received at the output of the mixer since, as $f_2$ is supposed to be equal to $f_1$, $df$ represents the heterodyning or beat frequency.

It should be noted that it is of interest to provide between oscillators I and II and the mixer stage a coupling by capacitors as shown by $a$ and $b$. It is known that it is difficult to maintain at a constant value the frequency $f$ of generators of this kind, whereby the condition $f_1=f_2$ is somewhat difficult to comply with (although a variation would matter relatively little). But it has been found in practice that a capacitive coupling such as above referred to has for its effect so to speak to synchronize the two oscillators with respect to each other at least within a small range of frequency variations.

Adjustment means may be provided on said oscillators or on one of them to adjust the frequency and make it possible to return at any time to the condition $f_1=f_2$ for which there is no noise produced in receiver 4.

However, if no other precaution were taken, variations of the temperature of the atmosphere in the vicinity of the apparatus might make it impossible to maintain the equality of frequencies $f_1$ and $f_2$ with each other (in the absence of infra-red rays).

In order to obviate this difficulty, we make oscillators I and II symmetrical, that is to say identical in all their elements whereby variations of the atmospheric temperature or of the temperature of the apparatus act similarly upon each of them.

In particular, oscillator II may include a capacitor 7' identical to the capacitor 7 of oscillator I (Fig. 1), this capacitor 7' being provided to achieve identity between the two oscillators but being shielded from the infra-red rays to be detected. For instance this capacitor 7' will be housed in a small closed casing 20 (Fig. 1) through the wall of which infra-red rays cannot pass.

It is thus possible to make, according to the lay-out of Fig. 1, an apparatus of very light weight which, owing to its high sensitivity, can receive infra-red rays directly without an optical system and therefore has a wide field or angle of detection. However this apparatus is unsensitive to shocks and vibrations, so that its zero is very stable. Finally this apparatus has all the qualities that may be required concerning the nature of the indications relative to the infra-red transmitter to be detected. As a matter of fact, the intensity of the sound produced makes it possible to determine approximately the distance of said transmitter and, chiefly, the direction in which it is located since, by pivoting the apparatus, it is possible to observe from what direction the sound reception is maximum.

Concerning the sensitivity and stability of operation ($f_1=f_2$), it will be noted that they are improved by giving $f_1$ and $f_2$ a high value, averaging for instance from 1 to 3 megacycles. In these conditions and for a variation range averaging from zero to 10 kilocycles, for value $df$ (that is to say for the range of audible sounds), it is found that it is sufficient to have a maximum variation of 1% for the variable capacitor 7 under the action of the infra-red rays, which variation can easily be obtained with substances (Lenard phosphor) such as above described or any others having analogous properties.

The sensitivity, for such an apparatus, that is to say the minimum amount of energy required to operate it, will be for instance $10^{-6}$ watt, for a screen 5 of an area averaging 1 square cm. Furthermore the observation angle averages 150°, which is very different from the values corresponding to known apparatus requiring an optical system which greatly limits the observation angle.

For instance, an apparatus according to the present invention could detect at a distance of 115 meters an infra-red ray projector having a beam aperture angle of 5°, with a power of 1 watt.

Means are advantageously provided for adjusting the sensitivity of the apparatus, in particular by suitably choosing frequencies $f_1$ and $f_2$ and the active area of condenser 7 and by adjusting the angle with which the incident rays are received. As above stated, this sensitivity must be sufficient to detect the existence of an infra-red beam at a distance from its transmitter higher than the useful range of said transmitter (that is to say higher than the maximum distance at which vision is possible at night by means of said transmitter).

It will be noted that this optimum sensitivity can be obtained even for very small dimensions of the apparatus, by making use of midget tubes.

Figure 2:
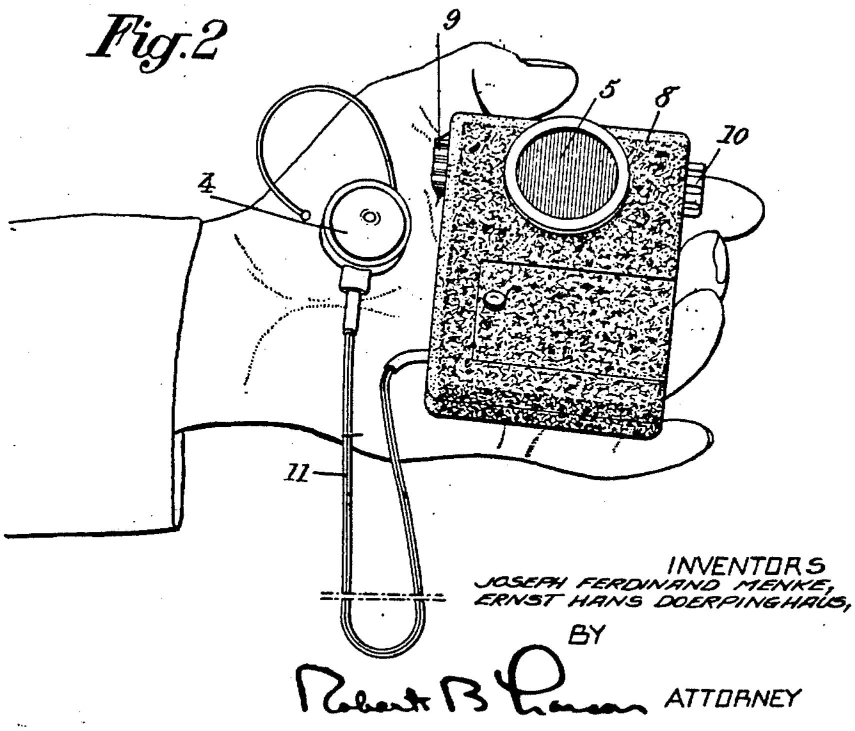
Fig. 2 is a perspective view of a portable apparatus of this kind.

An apparatus such as shown by Fig. 2, which can be held in one hand, can be easily obtained. The apparatus includes a casing 8 which contains said tubes and the annexed elements and also a 50 hours' pile or battery for the high and the low voltage (22.5 v. and 1.25 v. for instance).

On this Fig. 2, the screen is shown at 5 and the adjustment knobs at 9 and 10.

Telephone receiver 4, preferably of the crystal type, is connected with the apparatus through a cable 11 and can be hooked up on one ear so that the apparatus can be carried on the stomach or by hand or fixed at any other place.

But the apparatus may also be fixed on the helmet of a soldier.

Figure 3:
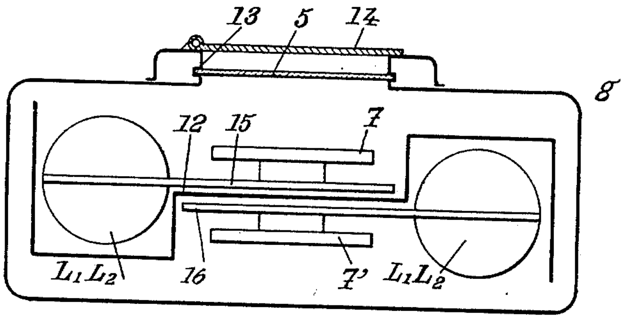
Fig. 3 is a sectional view of a modification of such an apparatus.

Fig. 3 is a cross section of an apparatus of the same kind embodying an advantageous feature concerning the arrangement of the two variable capacitors 7 and 7' or other equivalent cells or elements.

Casing 8 includes an inner partition 12 which divides it into two chambers containing said capacitors 7 and 7'. Capacitor 7 is subjected to the action of the incident infra-red rays passing through screen 5 fitted in opening 13. Capacitor 7' is insulated from the outside. Opening 13 may be closed by a shutter 14 the operation of which brings the apparatus into or out of action. The coils $L_1$, $L_2$ are carried by the sides of the casing, while the electronic tubes (not shown) are carried by support plates 15, 16.

In what precedes, it has been supposed that the variable capacity systems were constituted by capacitors having a variable dielectric constant. But we may use any other equivalent systems, provided that the infra-red rays act upon a fixed sensitive element of said devices.

Figure 4:
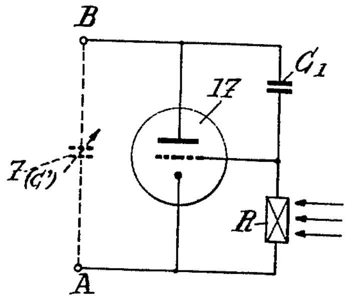
Fig. 4 is a diagrammatical view of a variable capacity system for use according to our invention.

Thus we may use, as diagrammatically shown by Fig. 4, the combination of an electronic tube 17 with a capacitor and a resistor variable in response to the action thereon of the infra-red rays to be detected (the whole constituting a photo-electrically controlled apparent resistor).

In an arrangement of this kind, including for instance an ordinary fixed capacitor $C_1$ inserted between the grid and the anode of the tube and a variable resistor R inserted between the cathode and the grid, the system disposed across terminals A and B connected to the cathode and the anode of the tube (any other suitable arrangement being possible) is of variable capacity and can play the same part as the above mentioned infra-red ray sensitive capacitor illustrated in dotted lines at 7 on Fig. 4, terminals A and B being connected to points A' and B' of Fig. 1, to substitute said system for capacitor 7.

In such a system, the resultant capacity C' is equal to $C'=C_1\times R\times S$, S being the slope of tube 17 in ampere/volts.

This system, with a midget tube 17, is of small volume and makes it possible to obtain apparatus equivalent to that of Figs. 2 and 3.

Resistor R, which is sensitive to infra-red rays, is made for instance of lead sulfide (PbS) or salts of the same kind where sulfur is replaced by selenium (PbSe) or tellurium (PbTe). Such substances have the property that their resistance varies under the effect of infra-red rays, for instance by 3.5 microns for PbS, 5.5 microns for PbSe and 7.5 microns for PbTe. The indication of these specific materials to constitute resistor R is not limitative.

It should also be well understood that, whatever be the embodiment chosen, at least a portion of the apparatus, that is to say at least its sensitive portion (this expression designating the infra-red rays sensitive element such as 7) can be carried by a rotary support so as to permit by rotation reception in all directions and thus to facilitate detection of an infra-red rays transmitter. The apparatus or the sensitive portion thereof may also be mounted directly upon an automatic gun so as to permit of training said gun on the transmitter of infra-red rays.

The apparatus as above described may be combined with any means for receiving signals of another kind, for instance telegraphic or telephonic signals, from a transmitter through modulated infra-red rays. This would enable men in possession of this apparatus to receive in addition to the infra-red rays coming from an enemy transmitter, telephonic or telegraphic signals from friendly troops.

In a general manner, while we have, in the above description, disclosed what we deem to be practical and efficient embodiments of our invention, it should be well understood that we do not wish to be limited thereto as there might be changes made in the arrangement, disposition and form of the parts without departing from the principle of the present invention as comprehended within the scope of the accompanying claims.

What we claim is:

1. A portable apparatus for detecting infra-red rays and indicating their intensity which comprises, in combination, a beat frequency oscillator, means for varying the beat frequency of said oscillator operative in response to variation of an electrical characteristic of an element thereof, said element being made of a substance sensitive to the direct action thereon of incident infra-red rays of a wavelength ranging from 0.75 to 7 microns so that said electrical characteristic of said substance varies in accordance with the intensity of such infra-red rays striking it, and means for converting the beat signals from said oscillator into a sound signal, whereby the pitch of said sound signal varies in accordance with the intensity of the infra-red rays incident on said substance.

2. An apparatus according to claim 1 in which said substance is of the Lenard phosphor type consisting of a cadmium salt of the group constituted by cadmium sulfide, cadmium selenide and cadmium telluride.

3. An apparatus according to claim 1 in which said substance is of the Lenard phosphor type consisting of a zinc salt of the group constituted by zinc sulfide, zinc selenide and zine telluride.

4. An apparatus according to claim 1 in which said substance is a body of the group consisting of semiconductor sulfides, selenides and tellurides.

5. An apparatus according to claim 1 in which said substance is a salt of the group consisting lead sulfide, lead selenide and lead telluride.

6. An apparatus for detecting infra-red rays comprising, in combination, an electronic device including a pair of oscillators tuned to the same frequency, a mixer having the input thereof connected with the output of said oscillators, variable capacity means included in the circuit of one of said oscillators, said variable capacity means including a dielectric effect element sensitive to the direct action of incident infra-red rays thereon, so as to undergo variation of its electrical properties corresponding to variation of the intensity of said incident infra-red rays, and means connected with the output of said mixer for converting the beat signals delivered by said mixer into a sound, whereby said sound is of a pitch variable in accordance with the intensity of the incident infra-red rays.

7. An apparatus for detecting infra-red rays which comprises, in combination, two oscillators tuned to the same frequency, a mixer having its input connected with the respective outputs of said two oscillators, variable capacity means including an element made of a dielectric effect substance sensitive to the direct action of incident infra-red rays thereon so as to undergo variation of its electrical properties corresponding to variation of the intensity of said incident infra-red rays, said means being connected with the input of each of said oscillators respectively in such a manner as to be capable of varying the frequency thereof in response to the action of infra-red rays on said element, means for shielding one of said infra-red ray sensitive elements against the action of infra-red rays, and means connected with the output of said mixer for converting the beat signals delivered by said mixer into a sound, whereby said sound is of a pitch variable in accordance with the intensity of the incident infra-red rays.

8. An apparatus for detecting a source of infra-red rays which comprises, in combination, two oscillators tuned to the same frequency, a mixer having its input connected with the respective outputs of said two oscillators, variable capacity means including an element made of a dielectric effect substance sensitive to the direct action of infra-red rays thereon, so as to undergo variation of its electrical properties corresponding to variation of the intensity of said incident infra-red rays, said means being connected with the input of each of said oscillators respectively in such a manner as to be capable of varying the frequency thereof in response to the action of infra-red rays on said element, means for shielding one of said infra-red ray sensitive elements against the action of infra-red rays, and a telephone transmitter connected with the output by said mixer into sound waves, whereby said sound is of a pitch variable in accordance with the intensity of the incident infra-red rays.

9. An apparatus according to claim 6 in which said variable capacity means consist of a capacitor, said element being the dielectric of said capacitor, said dielectric being made of a substance having a dielectric constant variable in response to variation of the intensity of the infra-red rays incident thereon.

References Cited in the file of this patent

UNITED STATES PATENTS

| | | |
|---|---|---|
| 2,098,386 | Hansell | Nov. 9, 1937 |
| 2,349,715 | Francis | May 23, 1944 |
| 2,543,039 | McKay | Feb. 27, 1951 |
| 2,659,682 | Anderson | Nov. 17, 1953 |
| 2,706,792 | Jacobs | Apr. 19, 1955 |